United States Patent [19]

Zawodny et al.

[11] Patent Number: 4,839,678
[45] Date of Patent: Jun. 13, 1989

[54] FILM COUNTER FOR CAMERAS

[75] Inventors: Arthur Zawodny, Budd Lake, N.J.; Vladimir Fridman, New City, N.Y.

[73] Assignee: Keystone Camera Corporation, Clifton, N.J.

[21] Appl. No.: 160,716

[22] Filed: Feb. 26, 1988

[51] Int. Cl.⁴ .............................................. G03B 17/36
[52] U.S. Cl. .................................................... 354/217
[58] Field of Search ........................................ 354/217

[56] References Cited

U.S. PATENT DOCUMENTS

| | | | |
|---|---|---|---|
| 2,591,417 | 4/1952 | Frye | 95/31 |
| 3,011,419 | 12/1961 | Takahama | 95/31 |
| 3,057,277 | 10/1962 | Swarofsky | 95/31 |
| 3,459,110 | 8/1969 | Papke | 95/31 |
| 4,021,828 | 5/1977 | Iura et al. | 354/217 |

Primary Examiner—Michael L. Gellner
Attorney, Agent, or Firm—Neuman, Williams, Anderson & Olson

[57] ABSTRACT

A film counter indicator dial is journalled in a camera door and carries frame count indicia visible through a window in the door. The dial has peripheral gear teeth to form a worm gear which, when the door is closed, is meshed with a worm which is coupled to a sprocket wheel to be driven by film in both advance and rewind directions of movement. The worm and sprocket wheel are carried by a pressure plate and the dial is driven only when the door is closed. When the door is opened, the dial is returned to an initial position by a spring-urged lever which is engaged with a cam formation on the dial.

21 Claims, 4 Drawing Sheets

FILM COUNTER FOR CAMERAS

BACKGROUND OF THE INVENTION

1. Field of the Invention

This invention relates to a film counter for cameras and more particularly to a film counter which provides an accurate indication of the number of a film currently positioned in an exposure region with a high degree of reliability. A mechanism is provided which is convenient to use and efficient, reliable and trouble-free in operation while being relatively simple and readily economically assembled and manufactured using a small number of component parts.

2. Background of the Prior Art

Film counters have been provided in the prior art in which the film counter indicator is mechanically coupled to the film advancing mechanism, a manual reset of the counter being generally required. The Frye U.S. Pat. No. 2,591,417 shows one type of construction. The Takahama U.S. Pat. No. 3,011,419, the Swarofsky U.S. Pat. No. 3,057,277 and the Papke U.S. Pat. No. 3,459,110 show film counters which may be reset automatically upon opening of the camera door and which require use of a ratchet mechanism incremented against spring tension as film is advanced. The Iura et al U.S. Pat. No. 4,021,828 discloses a film count arrangement using electronic circuitry and indicators. These and other prior art types of cameras with film counters have had deficiencies, either with respect to performance and reliability and/or with respect to complexity and cost of manufacture.

SUMMARY OF THE INVENTION

This invention was evolved with the general object of overcoming disadvantages of prior art constructions and of providing a film counter which is highly reliable and effective while being comparatively simple and reliable and trouble-free in operation.

In a camera constructed in accordance with this invention, film-driven means are provided on a door of the camera and includes a sprocket wheel or the equivalent having teeth engageable in sprocket holes of a film moved over a film support to be driven by the film. A frame count indicator is driven from the film-driven means and is also mounted on the door. The indicator is preferably in the form of a rotatable dial and it includes indicia for indicating the frame number of a section of film currently positioned in the exposure region, the indicia being preferably viewed though a view window in a rear wall of the door. Thus, a mechanical arrangement is provided of comparatively simple form.

An important feature is that the count indicator is moved from movement of the film in both advancing and rewind directions to display a frame count which is incremented during film advance and which is decremented during film rewind.

Another important feature is in the provision of a reset means such that the frame count indicator is moved to a predetermined initial condition upon opening of the door. A specific feature is that the rotatable dial of the frame count indicator is moved to an initial position through the action of a spring and the force of the spring is so applied as to assist movement during a portion of angular movement of the dial while always being operative to return the dial to the initial position.

In a preferred embodiment, the rotatable dial is moved to an initial position through the cooperation of a cam formation thereon and a spring-urged member engageable with the cam formation. The cam formation preferably has a generally heart-shaped configuration and is so arranged that during part of a revolution, which may preferably be 180 degrees, the cam forces act to cause rotation in one direction and during the remaining part of the revolution, the cam forces act to cause rotation in the reverse direction. The energy required to move the dial is minimized in normal operation of the camera and, in the case of a battery-operated motorized camera, the current drain on the battery is minimized.

A further feature relates to the provision of a mechanical coupling between a film-driven rotatable sprocket wheel and the frame count indicator, the mechanical coupling being disengaged when the door is opened. Preferably, the sprocket wheel is carried by a spring-urged pressure plate and the mechanical coupling is disengaged when the pressure plate is moved forwardly upon opening of the door. To obtain the required movement of a rotatable dial in proportion to film advance, a gear reduction is required and a further feature relates to the provision of a worm gear assembly, with the worm of the assembly being carried by the pressure plate and being coupled to the sprocket wheel and with the worm gear being carried by the main body of the door. In this arrangement, the worm gear may also form the rotatable dial frame count indicator.

This invention contemplates other objects, features and advantages which will become more fully apparent from the following detailed description taken in conjunction with the drawings.

DESCRIPTION OF A PREFERRED EMBODIMENT

Figure 1:
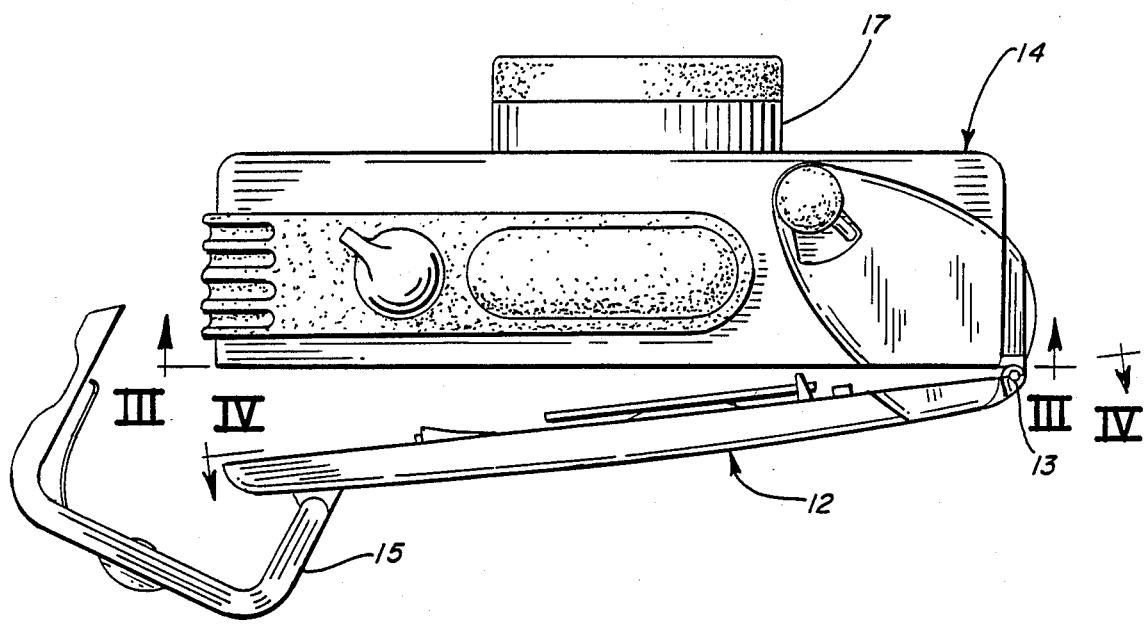
FIG. 1 is a top plan view of a camera which is constructed in accordance with the invention, shown with a door thereof in an open position.
Figure 2:
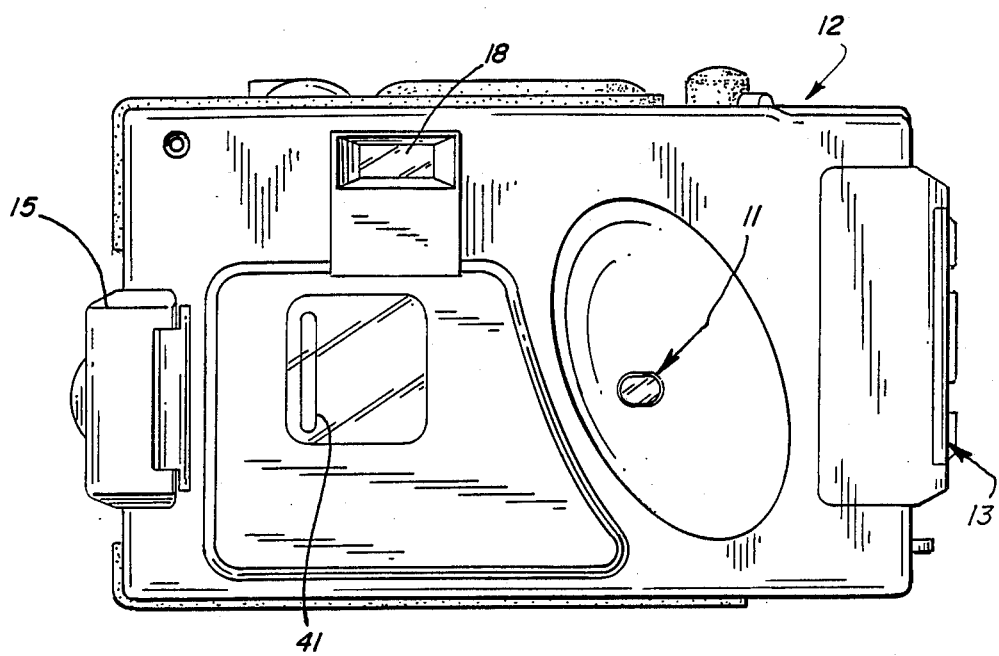
FIG. 2 is a rear elevational view of the camera of FIG. 1, with the door closed.

Reference numeral 10 generally designates a camera which includes a film counter constructed in accordance with the principles of this invention and which includes indicia visible through a view window 11 on a back 12 of the camera, as shown in FIG. 2. In the top plan view of FIG. 1, the door 12 is shown in an open position. It is connected through a hinge 13 to a main body 14 of the camera and may be locked in a closed position by a generally U-shaped latch device 15 which is connected through a hinge 16 to the door 12 for rotation after closing the door 12 to lockingly embrace a portion of the main body 14. A lens mount structure 17 projects from the front side of the camera and a viewfinder 18 and it will be understood that the camera 10 includes other features necessary or desirable for normal operation. The camera 10 may preferably be a battery-operated motorized camera but it will be understood that the principles of the invention may be applied to manually operated cameras and that the invention is not limited to motorized cameras.

Figure 3:
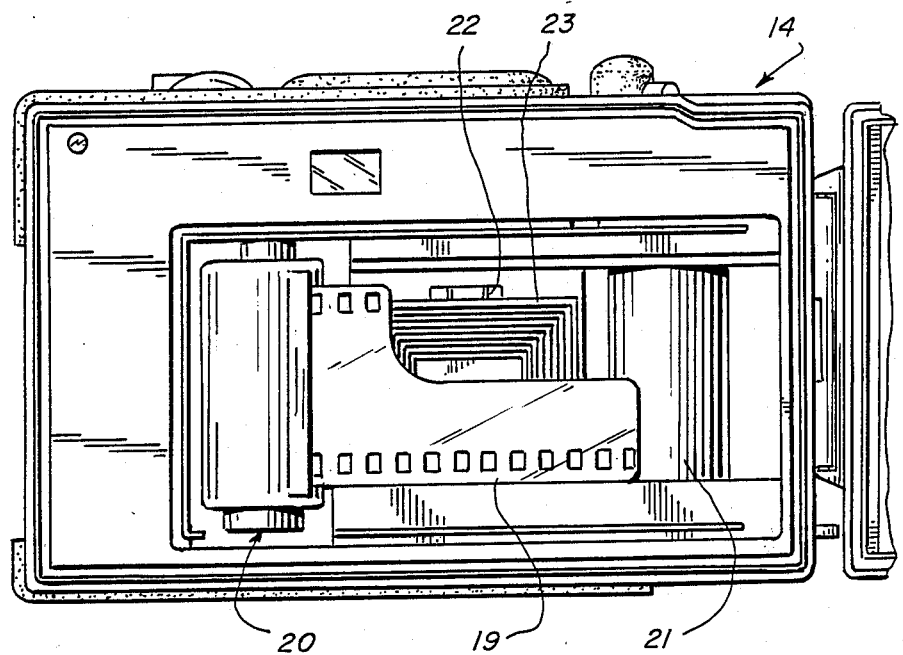
FIG. 3 is an elevational view looking at a portion of the rear of the body of the camera of FIG. 1, in a direction as indicated by line III—III in FIG. 1.

FIG. 3 is a view looking at the rear of the camera body with the door open, in a direction as indicated in FIG. 1. Film 19 is drawn from a supply spool in a conventional cartridge 20, a leader of the film being engaged with a take-up spool 21. A sprocket wheel 22 engages sprocket holes in the film 21 and is driven in conjunction with the take-up spool 21 to advance the film frame-by-frame over a film support 23 which is around the periphery of the rear end of an exposure chamber 24 of the camera. The take-up spool and the sprocket wheel 22 may be driven by a suitable motor drive which may also be operative to drive the supply spool of the cartridge 20 in a rewind operation. However, it will be understood that manual film advance and manual rewind operations may be used in conjunction with the film counter system of the invention.

Figure 4:
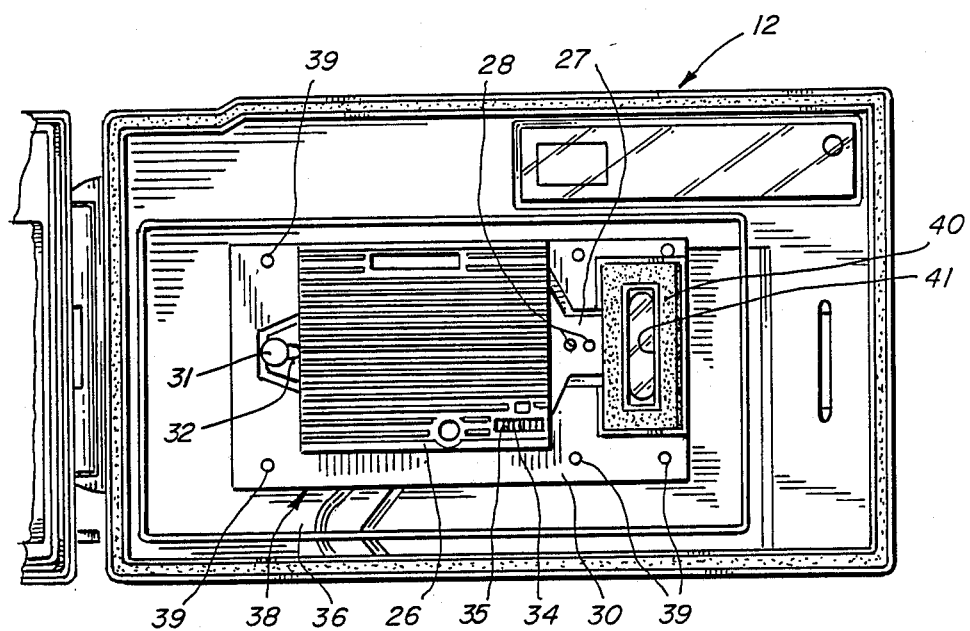
FIG. 4 is an elevational view looking at the front of the door of the camera of FIG. 1, looking in a direction as indicated by a line IV—IV in FIG. 1.

FIG. 4 is a view looking rearwardly at the front side of the door 12 of the camera, as indicated in FIG. 1. A pressure plate 26 is secured to an intermediate portion of a leaf spring 27, one end of the spring 27 being secured by elements 28 to an intermediate wall portion 30 of the door 12. Elements 28 may be screens or may be rivets which may simply be projecting posts of a plastic member which are heated to form rivet heads in assembling the camera. The other end of the spring 27 is held against the wall portion 30 by the head of a metal pin 31 which has a shank portion engaged in a slot 32 of the spring member 27. The pressure plate 26 carries a sprocket wheel 34 which projects through an opening 35 in the wall of the pressure plate and which has four teeth 34a–34d for engagement in the sprocket holes of the film 19 as it is moved between the supply and take-up spools.

As also shown in FIG. 4, the door includes a main portion 36 and the intermediate wall portion 30 is provided by a member 38 separate from the main portion of the door but secured thereto by rivets 39. The member 38, in addition to supporting the spring 27, may also support a resilient foam member 40 which is engageable with the outside of the film cartridge 20 and which is disposed around the periphery of a view window 41 through which indicia on the outside of the film cartridge 20 may be viewed, such indicia indicating the type of film in the cartridge.

In accordance with the invention, the sprocket wheel 34 drives a mechanism which is carried by the door 12 and which includes a film indicator having indicia visible through the window 11, to indicate the frame number of a frame currently positioned in the exposure region within the film support 23.

Figure 5:
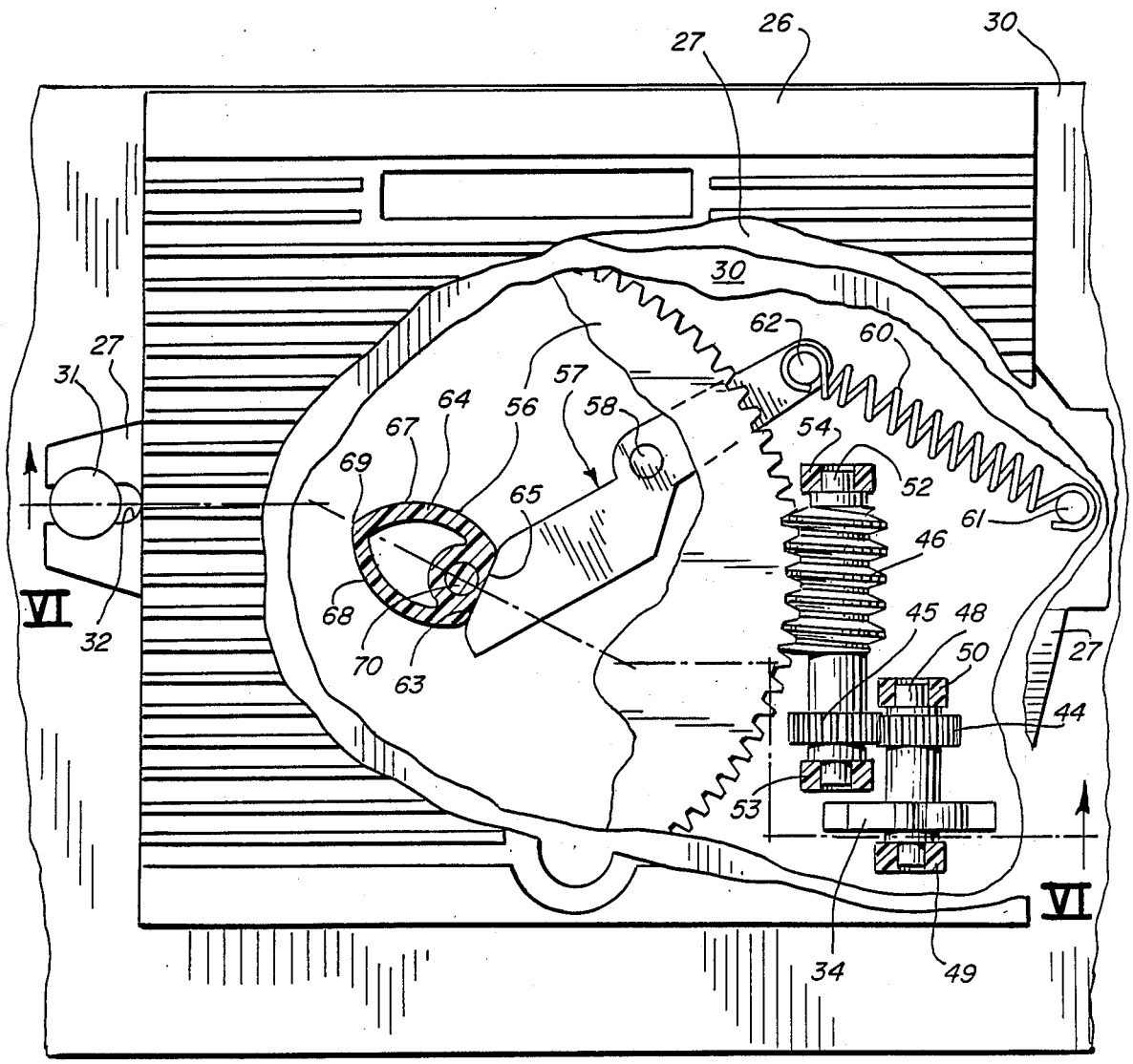
FIG. 5 is a view similar to a portion of FIG. 4 but on an enlarged scale and with portions of certain parts broken away in order to show the operative relationship of components of a mechanism of the invention, the parts being shown in the condition with the camera door closed.

FIG. 5 is a view similar to a portion of FIG. 4 but on an enlarged scale and with portions of the pressure plate 26 and wall portion 30 broken away in order to show the operative relationship of components of the mechanism of the invention. A gear 44 forms an assembly with the sprocket wheel 34, the two parts being preferably molded as a unit from plastic. Gear 44 meshes with a gear 45 which forms an assembly with a worm 46, the assembly of the gear 45 and worm 46 being also journalled on the pressure plate 26. To journal the assembly of the sprocket wheel 34 and the gear 44 on the pressure plate 26, a pin 48 extends through the assembly and is journalled at opposite ends by bearings 49 and 50. Similarly, a pin 52 extends through the assembly of the gear 45 and worm 46 and is journalled by bearings 53 and 54. All of the bearings 49, 50, 53 and 54 are integral with the pressure plate 26 or are otherwise secured thereto.

When the door 12 is moved to a closed position, the teeth 34a–34d of the sprocket wheel 34 will engage in the sprocket holes of any film in the camera and, at the same time, the worm 46 is brought into meshing relationship to the peripheral teeth of a worm gear portion of a member 56 which also operates as a dial, indicia being provided on its rearward face which is visible through the window 11 to indicate the frame count. Worm gear and dial member 56, when initially engaged by the worm 46, is in the position as shown in FIG. 5, being held in that position when the door is open by means of a spring-urged lever 57. Lever 57 is pivotally supported on a pin 58 and is urged by a spring 60 in a clockwise direction as viewed in FIG. 5, spring 60 being connected between a fixed pin 61 on the main body 36 of the door and a pin 62 at one end of the lever 57. At its opposite end, the lever 57 has a surface 63 which engages a cam formation 64 on the worm gear and dial member 56. The cam formation 64, as shown, is generally heart-shaped and it includes a flat portion 65 which is engaged by the surface 63 in the position of the worm gear and dial member 56 as illustrated in FIG. 5. In addition, it includes two portions 67 and 68 which are symmetrical with respect to a plane of symmetry which is through the axis of the worm gear and dial member 56 and which intersects the center of the surface 65 at right angles thereto. Each of the sections 67 and 68 has a radius which increases as the arcuate distance from the surface 65 increases, the surfaces 67 and 68 meeting at a point 69 along the plane of symmetry.

When the door 12 is opened to disengage the worm 46 from the worm gear and dial member 56, the worm gear and dial member 56 is always returned to the position a illustrated in FIG. 5. The required spring force is minimized since the member 56 is disengaged from the worm and there is very little function. Numbers always rotate through the minimum required angle in returning to the initial position. If, for example, the worm gear and dial member 56 is rotated in a counterclockwise direction from the illustrated position and through an angle less than 180 degrees, the surface 67 will be engaged by the surface 63 of the lever 57 to move the worm gear and dial member 56 back in a clockwise direction. If the worm gear and dial member 56 is rotated in a counterclockwise direction through an angle greater than 180 degrees, the cam surface 68 will be engaged by the surface 63 of lever 57 to move the worm gear and dial member 56 further in a counterclockwise direction and through an angle of less than 180 degrees to the position as illustrated. It is also noteworthy that the worm gear and dial member 56, when being driven in either direction, rotates against the action of the return spring 60 during only half of a revolution. During the remaining half of a revolution, the spring force assists rotation in the desired direction and energy consumption is minimized. This feature is especially advantageous in battery-operated motorized cameras.

Figure 6:
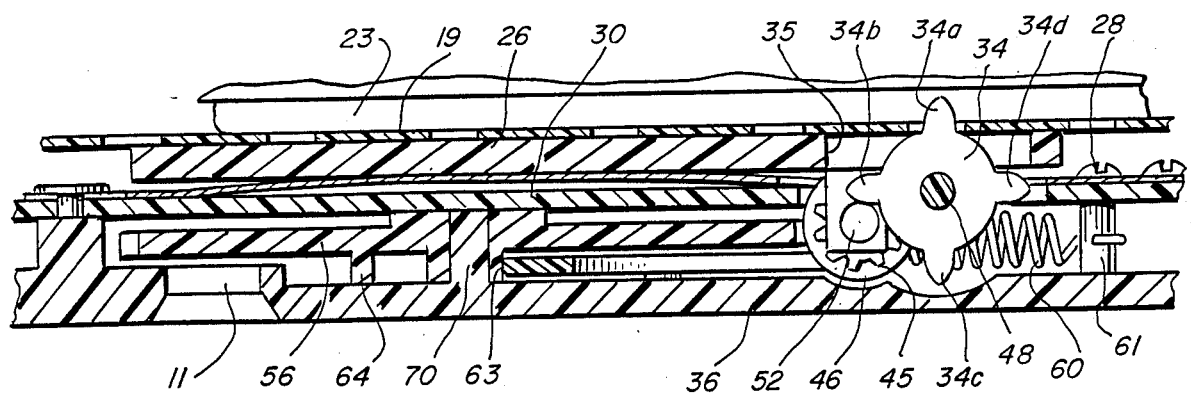
FIG. 6 is a sectional view taken substantially along line VI—VI of FIG. 5, showing the parts in a condition in which the camera door is closed.
Figure 7:
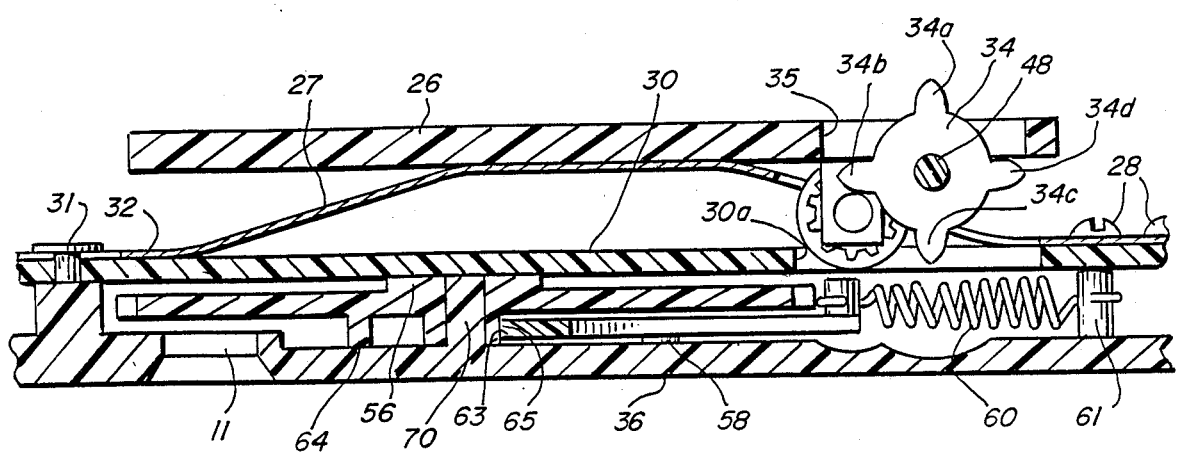
FIG. 7 is a cross sectional view similar to FIG. 6, showing the position of the parts on the camera door when it is opened.

FIGS. 6 and 7 clarify the construction of the mechanism. FIG. 6 is a sectional view taken substantially along line VI—VI of FIG. 5, showing the parts in a condition in which the door 12 is closed and FIG. 7 is a similar cross sectional view, showing the position of the parts when the door 12 is open. The form and action of the leaf spring 27 is illustrated and as also shown, the sprocket wheel 34, gears 45 and 46 are carried by the pressure plate 26 and are movable through an opening 30a in the wall portion 30. The worm 46 is engaged with the worm gear and dial member 56 in the closed position of FIG. 6 but is disengaged in the open position of Figure 7, the worm 46 as well as the gears 44 and 45 and the sprocket wheel 34 being carried by the pressure plate 26. As is also shown, the lever 57 is on the rear side of the worm gear and dial member 56 and the support pin 58 for the lever 57 projects forwardly from the main portion 36 of the door 12. In a similar manner, a support pin 70 for the worm gear and dial member 56 opens forwardly from the wall 36 of the door 12. The cam formation 64 is on the rearward side of the worm gear and dial member 56, for coaction with the lever 57. As is also shown, the extension spring 60 is connected to the pin 61 which extends forwardly from the wall portion 36 of the door 12.

Figure 8:
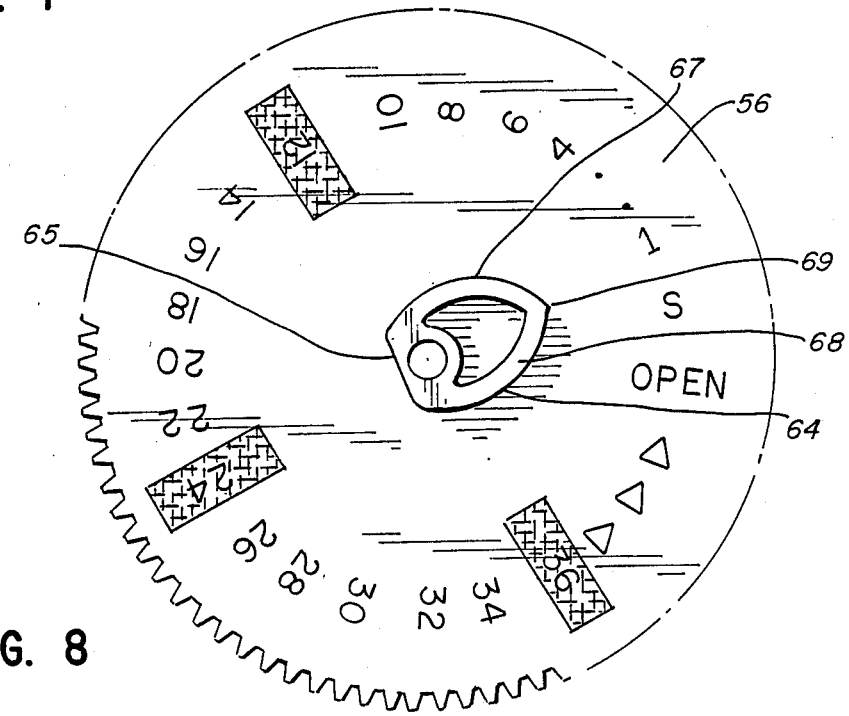
FIG. 8 is a rear elevational view of a worm gear and dial member of the mechanism of the invention.

FIG. 8 shows the indicia which is provided on the rear face of the worm gear and dial member 56 and which is visible through the window 11. It is noted that at all times when the door 12 is closed, the teeth 34a-34d of the sprocket wheel 34 will engage in sprocket holes of any film in the camera and the sprocket wheel 34 is thereby driven during both film advancing and film rewinding operations, always accurately indicating the number of the frame currently positioned in the exposure region. Also, it provides an indication of the presence of any film in the camera and an indication when the film has been rewound so that it is safe to open the camera. It allows use of film of any length. The counter is automatically reset to zero upon opening of the door, utilizing the movement of the pressure plate. No special locking means are required to prevent return movement of the counter. It is also a feature of the construction that the rotation of the mechanism is against the action of the returning spring 60 during only half of a revolution of the worm gear and dial member 56.

In addition, the mechanism is relatively simple and quite compact. It is fully contained in the door of the camera and does not require the cooperation of any parts on the camera body.

It will be understood that modifications and variations may be effected without departing from the spirit and scope of the novel concepts of this invention.

I claim:

1. A camera comprising: housing means defining an exposure chamber and a film support at a rearward end of said exposure chamber to support the periphery of a section of film in an exposure region for exposure of a frame thereof, film supply spool receiving means and film advance means in said housing means for moving film in advance and rewind directions through said exposure region, door means on said housing means movable between an open position permitting access to said spool receiving and film advance means and a closed position behind said spool receiving and film advance means and said exposure region, frame count indicating means mounted on said door means and including indicia means for indicating the frame number of a section of film currently positioned in said exposure region, and film-driven means on said door means and including tooth means engageable in sprocket holes of a film moved over said film support to be driven by the film, said film-driven means being arranged for moving said frame count indicating means in response to movement of said film through said exposure region.

2. A camera as defined in claim 1, said frame count indicating means being moved by said film-driven means during movement of the film in both advancing and rewind directions to display a frame count which is incremented during film advance and which is decremented during film rewind.

3. A camera as defined in claim 2, said film-driven means comprising a rotatable sprocket wheel and said tooth means comprising peripheral teeth having an arcuate spacing corresponding to the distance between sprocket holes of the film, and said frame count indicating means being arranged to be mechanically coupled to said rotatable sprocket wheel to be moved in proportion to rotation of said sprocket wheel.

4. A camera as defined in claim 1, reset means for moving said frame count indicating means to a predetermined initial position upon opening of said door means.

5. A camera as defined in claim 4, said frame count indicating means being coupled to said film-driven means in said closed position of said door means and being decoupled from said film-driven means in said open position of said door means to allow operation of said reset means.

6. A camera as defined in claim 4, said frame count indicating means being movable by said film-driven means away from said initial position in proportion to movement of the film in said advance direction and being movable by said film driven means toward said initial position in proportion in movement of the film in said rewind direction.

7. A camera as defined in claim 6, said frame count-indicating means including indicia for indicating that any film in the camera has either not been advanced or has been rewound.

8. A camera as defined in claim 6, said reset means including spring means biasing said frame count indicating means toward said initial position, said frame count indicating means being coupled to said film-driven means in said closed position of said door means and being decoupled from said film-driven means in said open position of said door means to allow reset of said frame count indicating means by said spring means to said initial position.

9. A camera as defined in claim 3, said frame count indicating means comprising an indicating dial supported on said door means for rotation relative thereto, and reduction gear means mechanically coupling said sprocket wheel to said indicating dial to rotate said indicating dial through a predetermined angle during movement of the film from one frame to another.

10. A camera as defined in claim 1, said door means including a rear wall, a pressure plate, and spring means urging said pressure plate forwardly from said rear wall for engaging said pressure plate with a section of film in said exposure region and urging the periphery of said section against said film support, said film-driven means being carried by said pressure plate.

11. A camera as defined in claim 10, said frame count indicating means being mounted on said rear wall of said door means.

12. A camera as defined in claim 11, coupling means between said film-driven means on said pressure plate and said frame count indicating means on said rear wall, said coupling means being disengaged when said pressure plate is moved away from said rear wall by said spring means in said open position of said door means and being engaged when said pressure plate is moved toward said rear wall through engagement with a section of film in said closed position of said door means.

13. A camera as defined in claim 12, said coupling means including gear means arranged to intermesh when said pressure plate is moved toward said rear wall.

14. A camera as defined in claim 13, said gear means comprising a worm gear rotatably supported on said rear wall, and a worm rotatably supported on said pressure plate.

15. A camera as defined in claim 14, said film-driven means comprising a sprocket wheel rotatably supported on said pressure and said tooth means comprising peripheral teeth having an arcuate spacing corresponding to the distance between sprocket holes of the film, and said gear means further comprising a pair of intermeshing gears one coupled to said sprocket wheel and the other coupled to said worm.

16. A camera as defined in claim 14, said worm gear having a rear face disposed against a forward surface portion of said rear wall, and said indicia means being provided on said rear face of said worm gear whereby said rear face of said worm gear and associated indicia means form a dial, and means defining a view window in said rear wall behind said dial for viewing of said indicia means.

17. A camera as defined in claim 3, said frame count indicating means comprising an indicating dial supported on said door for rotation relative thereto, reset means comprising reset member and a reset spring urging said reset member in one direction, and a cam surface associated with said dial, said reset spring urging said reset member into engagement with said cam surface to urge said dial to a predetermined initial position.

18. A camera a defined in claim 17, said dial being coupled to said film-driven means in said closed position of said door and being decoupled from said film-driven means in said open position of said door to allow said reset spring to act through said reset member and cam surface to move said dial to said predetermined initial position upon opening of said door.

19. A camera as defined in claim 18, said cam surface and said reset member being so configured and arranged that the force of said reset spring acts to oppose rotation of said dial during one half of a revolution of said dial in one rotational direction and acts to assist rotation of said dial during a remaining half of a revolution of said dial in said one rotational direction.

20. A camera as defined in claim 17, said dial being rotated through nearly a complete revolution in rotating from said initial position to a position at which a maximum frame count is indicated by said dial.

21. A camera as defined in claim 12, means defining a view window in said rear wall behind said frame count indicating means.

* * * * *